United States Patent

Segawa

[11] Patent Number: 5,238,497
[45] Date of Patent: Aug. 24, 1993

[54] APPARATUS FOR SHAPING SOLID PROFILE RESIN BODIES

[75] Inventor: Takashi Segawa, Kanagawa, Japan

[73] Assignee: Sony Corporation, Tokyo, Japan

[21] Appl. No.: 770,331

[22] Filed: Oct. 3, 1991

[30] Foreign Application Priority Data

Oct. 5, 1990 [JP] Japan .................. 2-266487

[51] Int. Cl.$^5$ ................................... B05C 5/00
[52] U.S. Cl. ........................ 118/641; 118/407
[58] Field of Search ............. 118/641, 642, 323, 407, 118/423

[56] References Cited

U.S. PATENT DOCUMENTS 5,143,663 9/1992 Leyden et al. .................. 118/423

Primary Examiner—Peter Chin
Assistant Examiner—Charles K. Friedman
Attorney, Agent, or Firm—Hill, Steadman & Simpson

[57] ABSTRACT

An apparatus for shaping a solid profile of a resin body by which time required for shaping of a resin body can be reduced and the quality of a product can be improved. A work is first dipped into solution of a photosetting resin accommodated in a resin vessel to a depth equal to a thickness with which a resin layer is to be formed on an upper face of the work. A dam member in the resin vessel defines a liquid level of the resin solution. Then, an elongated nozzle member is laterally horizontally moved along the upper face of the work while supplying resin solution to the upper face of the work to apply the resin solution by a desired thickness to the upper face of the work. Resin liquid spilled over from the dam member upon such movement of the nozzle member is accommodated once into an auxiliary resin solution accommodating section and then supplied to the nozzle member. Finally, light is irradiated upon the resin solution on the upper face of the work to harden the resin on the work to form a solidified resin layer on the work.

5 Claims, 3 Drawing Sheets

APPARATUS FOR SHAPING SOLID PROFILE RESIN BODIES

BACKGROUND OF THE INVENTION

1. Field of the Invention

This invention relates to a process of and an apparatus for shaping a solid profile of a resin body using a photo-setting resin.

2. Description of the Prior Art

It is already known to form, using a photo-setting resin, a solid or three-dimensional resin layer or layers such as, for example, a solid map of resin on a work. One of such techniques is disclosed, for example, in Japanese Patent Laid-Open Application No. 56-144478.

An exemplary one of conventional processes of forming solid resin layers using a photo-setting resin is described in detail below with reference to FIGS. 5A to 5D.

Referring first to FIG. 5A, photo-setting resin solution 2 is accommodated in a resin vessel 1, and a work receiving table 31 is dipped in the resin solution 2 and connected to a work dipping mechanism not shown. A work 8 is received on the work receiving table 31. Thus, a resin layer of a predetermined thickness is formed in the following manner on the work 8.

In an initial condition, an upper face of the work 8 is positioned in flush with a liquid level of the resin solution 2 as seen in FIG. 5A. Thus, the work 8 received on the work receiving table 31 is first sunk or dipped by a depth d in the resin solution 2 by the work dipping mechanism such that the resin solution 2 may come around to a position above the entire upper face of the work 8. Then, the work 8 is lifted by another distance h smaller than the depth d as shown in FIG. 5C by the work dipping mechanism. After then, rays of light, for example, a laser beam L, is irradiated upon a layer of the resin solution present above the upper face of the work 8 as illustrated in FIG. 5D. Consequently, the resin on the upper face of the work 8 is hardened to make a first solidified resin layer 21.

When two or more resin layers are to be formed, a similar sequence of operations will be repeated.

Such resin solution 2 normally has such a high viscosity that, if the work 8 is only dipped by a depth corresponding to a thickness of a resin layer to be formed on the work 8, the upper face of the work 8 may not be covered sufficiently with the resin solution 2. Or, much time may be required, depending upon a degree of viscosity of the resin solution 2, until the upper face of the work 8 is covered fully with the resin. Accordingly, the depth d by which the work 8 is dipped in the resin solution 2 illustrated in FIG. 5B in order to form a resin layer is selected to be a sufficiently greater distance than an actual thickness, for example, 0.2 mm, of such resin layer to be formed and for example, selected to be d=3 mm or so. Consequently, corresponding much time is required for such dipping movement by the work dipping mechanism. Further, while the work 8 is thereafter lifted by the distance h as seen from FIG. 5C, the resin solution layer above the upper face of the work 8 will be swollen considerably as shown in FIG. 5C due to a viscosity and a surface tension of the resin solution 2. And, much time is required until the resin at such swollen portion is flattened to form a flat layer of a predetermined thickness. Further, since the work dipping mechanism first lowers the work and then lifts the work in order to form a resin layer and repeats such lowering and lifting operations each time a resin layer is to be formed, corresponding much time is required for an entire working time.

For example, where the thickness of a resin layer to be formed is 0.2 mm, the size of the work is 100 mm × 100 mm and the depth d for the work to be dipped is d=3 mm, about 15 seconds are required for a step of forming a resin layer, and accordingly, the productivity is low. Further, also the problem of low quality of products due to non-uniformity of a resin film formed on an upper face of the work takes place significantly.

SUMMARY OF THE INVENTION

It is an object of the present invention to provide a process of an apparatus for shaping a solid profile of a resin body by which time required for shaping of a resin body can be reduced and the quality of a product can be improved.

In order to attain the object, according to one aspect of the present invention, there is provided a process of shaping a solid profile of a resin body, which comprises the steps of dipping a work into solution of a photo-setting resin to a depth equal to a thickness with which a resin layer is to be formed on an upper face of the work, moving an elongated nozzle member laterally horizontally along the upper face of the work while supplying resin solution to the upper face of the work to apply the resin solution by a desired thickness to the upper face of the work dipped in the resin solution, and irradiating light upon the resin solution on the upper face of the work dipped in the resin solution to harden the resin on the work to form a solidified resin layer on the work.

With the process, a work is moved only once so that it is dipped into the resin solution to a depth equal to a thickness with which a resin layer is to be formed on an upper face of the work. Accordingly, the distance of such dipping movement is smaller than the distance of a dipping movement of the conventional process described hereinabove with reference to FIG. 5B, and beside the step of such lifting movement of the conventional process as shown in FIG. 5C is omitted. As a result, a period of time required for intended movement of a work is reduced significantly. Further, since the resin solution is subsequently applied by a desired thickness to the upper face of the work by the nozzle member, the thickness of a resin layer formed on the work is uniform and accordingly a product has a high quality. Further, the invention eliminates, different from the conventional process described hereinabove, a swelling phenomenon of resin liquid arising from a high viscosity and a surface tension of such resin liquid and also eliminates a time required for flattening of a surface of resin liquid. Accordingly, a working time is further reduced.

When a solid or three-dimensional resin body is to be formed, the work dipping, nozzle moving and light irradiating steps are repeated by a plurality of times to form a desired number of solidified resin layers solidly on the upper face of the work. In this instance, light irradiated upon the resin solution on the upper face of the work may be scanned so as to selectively harden the resin on the work to form a solidified resin layer in a desired pattern. Preferably, a lower portion of the nozzle member maintains, during movement of the nozzle member, a meniscus condition with respect to a liquid level of the resin solution in which the work is dipped.

According to another aspect of the present invention, in order to put the process into practice, there is provided an apparatus for shaping a solid profile of a resin body, which comprises a resin vessel for accommodating solution of a photo-setting resin therein, a dam member disposed in the resin vessel and defining a liquid level of photo-setting resin solution accommodated in the resin vessel, the dam member cooperating with the resin vessel to define an auxiliary resin solution accommodating section for accommodating therein resin solution which is spilled over from the dam member, work dipping means for carrying a work thereon and dipping the work downwardly into and in the resin solution accommodated in the resin vessel, nozzle means including a nozzle member disposed for movement along a liquid surface of the resin solution and applying, during such movement thereof, resin solution to an upper face of the work dipped in the resin solution in the resin vessel, and light irradiating means for irradiating light to a layer of the resin solution applied to the upper face of the work to harden the resin layer.

Preferably, the work dipping means dips the work in the resin solution by a distance equal to a thickness of a resin layer to be formed on the work. The nozzle means may further include a resin supplying section for supplying resin solution from the auxiliary resin solution accommodating section to the nozzle member. Preferably, a lower portion of the nozzle member of the nozzle means maintains a meniscus condition with respect to the liquid level of the resin solution in the resin vessel during movement of the nozzle member. Preferably, the apparatus further comprises another dam member disposed in the resin vessel and cooperating with the resin vessel to define another auxiliary resin solution accommodating section for accommodating therein resin solution which is spilled over from the dam member, and the dam members are disposed adjacent the opposite ends of the path of movement of the nozzle member.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
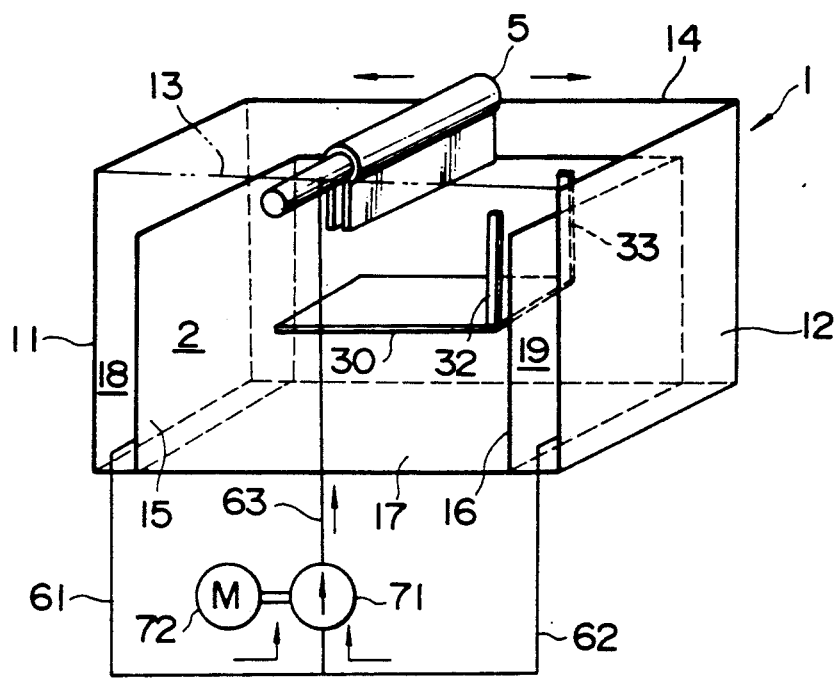
FIG. 1 is a schematic illustration showing a resin body solid profile shaping apparatus according to the present invention.

Referring first to FIG. 1, there is shown an apparatus for shaping a solid profile of a resin body according to the present invention. The resin body solid profile shaping apparatus shown includes a resin vessel 1, a work dipping mechanism, a nozzle mechanism, and a laser light source 4 (FIG. 3D).

The resin vessel 1 includes a pair of left and right side plates 11 and 12 and a pair of front and rear side plates 13 and 14, a bottom 17, and a pair of left and right dam members 15 and 16 disposed adjacent the left and right side plates 11 and 12, respectively, in a spacing defined by the side plates 11 to 14 and bottom 17. The dam members 15 and 16 have a height smaller than the height of the plates 11 to 14 and cooperate with the front and rear plates 13 and 14 to define therein a spacing in which resin solution 2 is contained. A left spilled over tank 18 is defined between the left side plate 11 and the left dam member 15 while a right spilled over tank 19 is defined between the right side plate 12 and the right dam member 16. The left and right dam members 15 and 16 have a height which defines a liquid level of the resin solution 2 accommodated in the spilled over tanks 18 and 19 which each serves as an auxiliary resin solution accommodating section. As hereinafter described, resin solution 2 spilled over from the dam member 15 or 16 is accommodated into the left or right spilled over tank 18 or 19 so that it may be used as resin solution to be applied to the work 8.

Figure 3A:
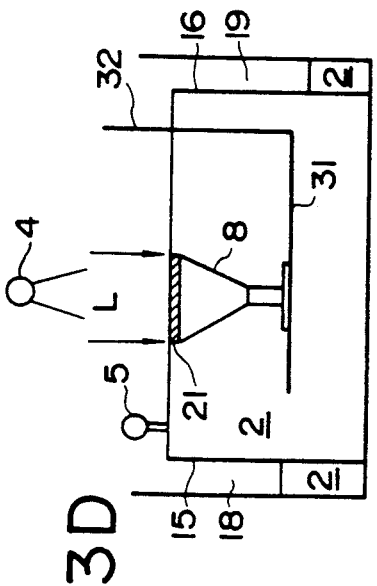
FIGS. 3A to 3F are schematic views showing successive different steps of a resin body solid profile shaping process performed on the resin body solid profile shaping apparatus of FIG. 1.

Referring also to FIG. 3A, the work lifting mechanism which includes a pair of carrying bars 32 and 33 connected to the work receiving table 31 lowers a work receiving table 31 dipped in the resin solution 2 together with a work 8 received on the work receiving table 31 by a predetermined distance.

The nozzle mechanism includes a nozzle 5, a nozzle moving mechanism not shown for moving the nozzle 5 leftwardly and rightwardly above the work 8 along the liquid level of the resin solution 2, three resin supply pipes 61 to 63 and a resin supplying pump 71 for supplying resin solution from the left or right spilled over tank 18 or 19 to the nozzle 5, and a pump driving motor 72 for driving the resin supplying pump 71.

Figure 2:
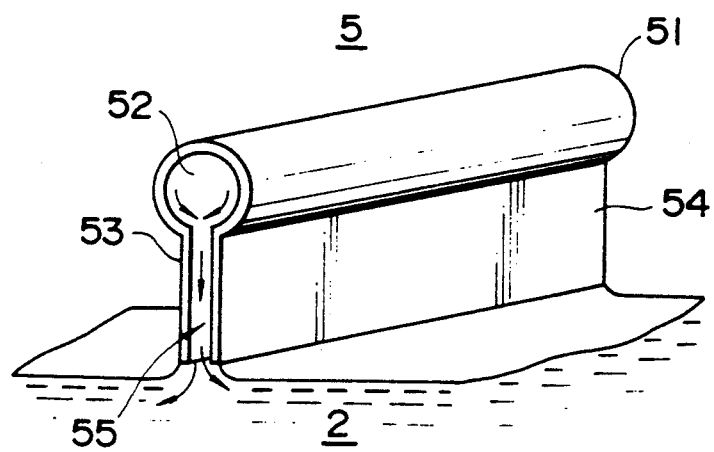
FIG. 2 is a schematic perspective view showing, in an enlarged scale, a nozzle employed in the resin body solid profile shaping apparatus of FIG. 1.

Referring now to FIG. 2, the nozzle 5 has a nozzle inner spacing 52 into which resin solution is supplied by way of the resin supply pipe 63, and includes a nozzle head 51 defining the nozzle inner spacing 52 therein and a pair of nozzle side plates 53 and 54 connected to lower portions of the nozzle head 51 into a unitary member. A resin dropping gap 55 is defined between the nozzle size plates 53 and 54. The other end of the nozzle head 51 remote from the resin supply pipe 63 is closed, and resin solution of a predetermined pressure supplied from the resin supplying pump 71 is dropped from the nozzle inner spacing 52 under a predetermined pressure by way of the resin dropping gap 55. Lower ends of the nozzle side plates 53 and 54 are positioned in a vertical direction such that resin solution which drops through the resin dropping gap 55 may maintain a meniscus condition with respect to a liquid level of the resin solution 2 in the resin vessel 1. Such meniscus condition is adjusted by the nozzle moving mechanism not shown with reference to a liquid level of the resin solution 2.

Subsequently, a process of forming a rigid resin layer using the resin body solid profile shaping apparatus shown in FIG. 2 will be described with reference to FIGS. 3A to 3F.

The resin body solid profile shaping apparatus is shown in an initial condition in FIG. 3A. In such initial condition, an upper face of the work 8 is positioned substantially at the same height as the liquid level of the resin solution 2 which is defined by the height of the left and right dam members 15 and 16. The nozzle 5 is positioned at a stationary position adjacent the right dam member 16.

Figure 3B:
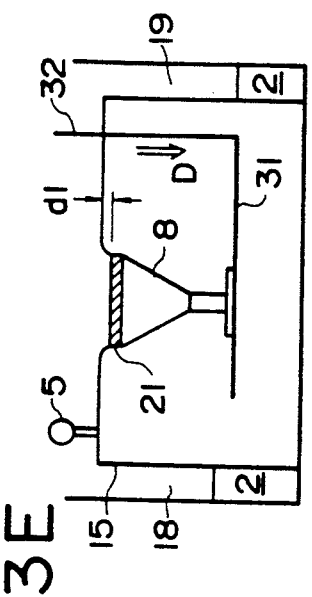

Referring now to FIG. 3B, the work receiving table 31 and the work 8 are sunk or dipped to a depth d1 equal to a thickness of a resin layer to be formed on the upper face of the work 8, for example, by d1=0.2 mm by the support bars 32 and 33 of the work lifting mechanism. However, the resin solution 2 may not be applied naturally to the upper face of the thus dipped work 8 or much time may be required for the resin solution 2 to come around to the upper face of such work 8 due to a high viscosity and a surface tension of the resin solution 2.

Figure 3C:
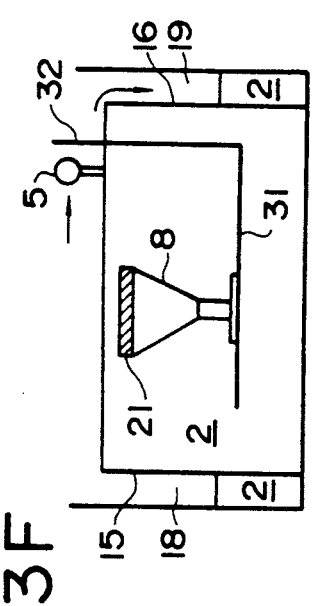
Figure 3D:
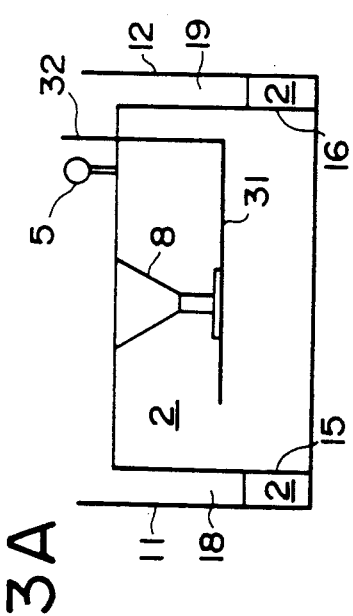

Therefore, the nozzle 5 is moved leftwardly from the position adjacent the right dam member 16 toward the left dam member 15 as seen in FIG. 3C by the nozzle moving mechanism. When the resin solution 2 is spilled over from the left dam member 15 as a result of such leftward movement of the nozzle 5, the thus spilled over resin solution 2 is accommodated into the left spilled over tank 18. The resin solution 2 accommodated in the left spilled over tank 18 is then supplied to the nozzle 5. During such leftward movement of the nozzle 5, resin solution from the spilled over tanks 18 and 19 is supplied into the nozzle inner spacing 52 of the nozzle 5, and the thus supplied resin solution drops through the resin dropping gap 55 of the nozzle 5. Such dropping of the resin solution 2 takes place while a meniscus condition of the resin solution 2 is maintained with respect to the liquid surface of the resin solution 2. As a result, to the upper face of the work 8 which has been dipped to the depth d1, the resin solution 2 is applied uniformly by a thickness equal to such depth d1. Since such application of the resin is performed while maintaining a meniscus condition, no bubble will enter the thus applied resin solution and a good result of application will be achieved.

In such a condition as described above, a laser beam L is irradiated upon the first resin layer 21 applied to the upper face of the work 8 from the light source 4 disposed above the work 8 as illustrated in FIG. 3D. Consequently, the first resin layer 21 is hardened. Upon such irradiation of the laser beam L, it is scanned in accordance with a pattern to be formed for the resin layer.

Figure 3E:
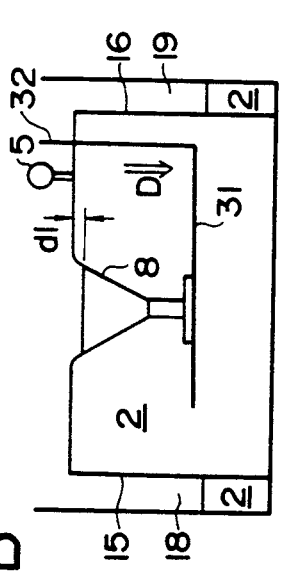
Figure 3F:
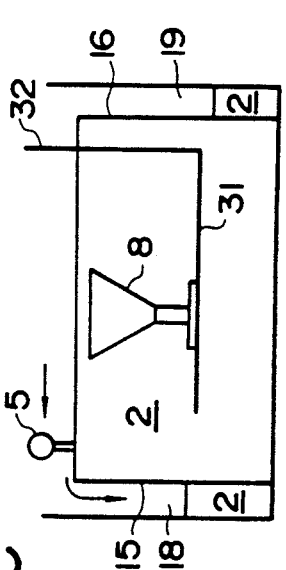

Formation of the first resin layer is thus completed. Then, in case a second resin layer is to be formed, the work 8 is dipped further by the depth d1 as seen in FIG. 3E similarly as shown in FIG. 3C, and then the nozzle 5 positioned adjacent the left dam member 15 is moved rightwardly toward the right dam member 16 while resin solution is being dropped from the nozzle 5, thereby to apply to the first resin layer 21 on the work 8 resin solution to make a second resin layer as seen in FIG. 3F. Resin solution spilled over from the right dam member 16 during rightward movement of the nozzle 5 is accommodated into the right spilled over tank 19. Also the resin solution accommodated in the right spilled over tank 19 is supplied to the nozzle 5 by the resin supplying pump 71.

Also third and following resin layers will be formed in a similar manner as described above. Each time a resin layer is to be formed, the nozzle 5 is moved alternatively between the left and right dam members 15 and 16 such that it may pass by the work 8.

Figure 5A:
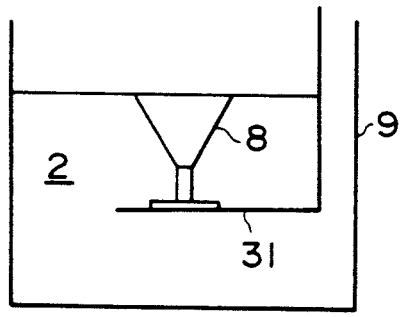
FIGS. 5A to 5D are schematic views showing successive different steps of a conventional resin body solid profile shaping process.
Figure 5C:
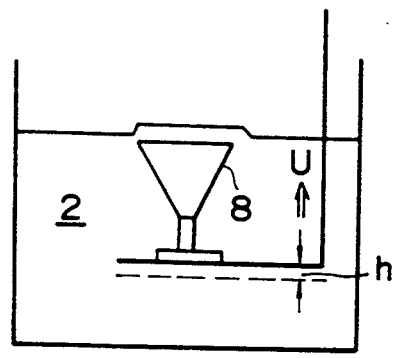
Figure 5B:
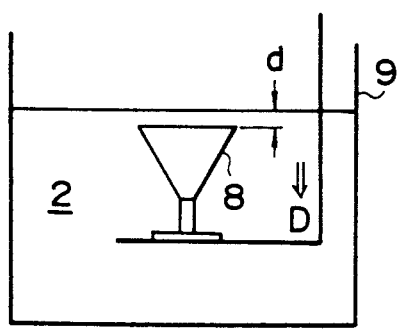
Figure 5D:
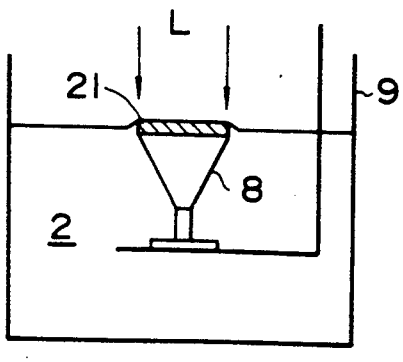

Since the depth d1 of dipping movement is set to a suitable value corresponding to a thickness with which a resin layer is to be formed while such upward movement of the work 8 as illustrated in FIG. 5C is eliminated and a period of time required for natural dropping of exclusive resin liquid from the upper face of the work 8 is decreased, a period of time required for formation of a resin layer on a work of the same size is reduced to 7 seconds which is shorter than one half the period of time required with the conventional apparatus and process described hereinabove. Further, since resin solution is applied uniformly to the upper face of the work 8 by the nozzle 5, a product is improved in quality.

When the present invention is put into practice, the embodiment described above may be modified in various manners.

For example, when a resin layer is to be formed, the nozzle 5 may be scanned not by a movement thereof in one direction as described hereinabove but by back and forth movements in the opposite directions to further improve the quality of a product.

Figure 4:
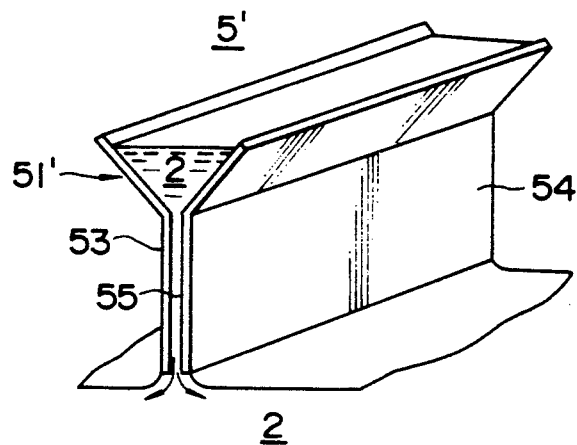
FIG. 4 is a schematic perspective view showing another form of the nozzle employed in the resin body solid profile shaping apparatus of FIG. 1.

Further, the nozzle 5 may have any other configuration only if it can apply resin solution uniformly to an entire face of a work. An exemplary one of such alternative nozzles is shown in FIG. 4. Referring to FIG. 4, an alternative nozzle 5' has a nozzle head 51' of a funnel-like shape in place of the cylindrical nozzle head 51 of the nozzle 5 shown in FIG. 2. Also the nozzle 5' can apply resin solution uniformly to an entire upper face of a work 8 by free dropping of resin solution contained in the funnel-shape nozzle head 51'.

Further, while a laser light source is employed as a light source for hardening photo-setting resin in the embodiment described hereinabove, a suitable light source such as a light source for ultraviolet rays can be selectively employed as a light source for such hardening in connection with characteristics of a photo-setting resin and so forth.

Having now fully described the invention, it will be apparent to one of ordinary skill in the art that many changes and modifications can be made thereto without departing from the spirit and scope of the invention as set forth herein.

What is claimed is:

1. An apparatus for shaping a solid profile of a resin body, comprising:
    a resin vessel for accommodating solution of a photo-setting resin therein:
    a dam member disposed in said resin vessel and defining a liquid level of photo-setting resin solution accommodated in said resin vessel, said dam member cooperating with said resin vessel to define an auxiliary resin solution accommodating section for accommodating therein resin solution which is spilled over from said dam member;
    work dipping means for carrying a work thereon and dipping the work downwardly into and in the resin solution accommodated in said resin vessel:
    nozzle means including a nozzle member disposed for movement along a liquid surface of the resin solution and applying, during such movement thereof, resin solution to an upper face of the work dipped in the resin solution in said resin vessel: and
    light irradiating means for irradiating light to a layer of the resin solution applied to the upper face of the work to harden the resin layer.

2. An apparatus according to claim 1, wherein said work dipping means dips the work in the resin solution by a distance equal to a thickness of a resin layer to be formed on the work.

3. An apparatus according to claim 1, wherein said nozzle means further includes a resin supplying section for supplying resin solution from said auxiliary resin solution accommodating section to said nozzle member.

4. An apparatus according to claim 1, wherein a lower portion of said nozzle member of said nozzle means maintains a meniscus condition with respect to the liquid level of the resin solution in said resin vessel during movement of said nozzle member.

5. An apparatus according to claim 1, further comprising another dam member disposed in said resin vessel and cooperating with said resin vessel to define another auxiliary resin solution accommodating section for accommodating therein resin solution which is spilled over from said dam member, said dam members being disposed adjacent the opposite ends of the path of movement of said nozzle member.

* * * * *